(12) United States Patent
Galbreath

(10) Patent No.: US 6,347,133 B1
(45) Date of Patent: Feb. 12, 2002

(54) TELEPHONE ANSWERING DEVICE WITH TIMER CONTROL

(76) Inventor: John Alexander Galbreath, Reisterstown, MD (US)

( * ) Notice: Subject to any disclaimer, the term of this patent is extended or adjusted under 35 U.S.C. 154(b) by 0 days.

(21) Appl. No.: 09/219,221

(22) Filed: Dec. 23, 1998

(51) Int. Cl.[7] .......................... H04M 1/64; H04M 11/00
(52) U.S. Cl. .......................... 379/67.1; 379/68; 379/76; 379/88.01; 379/93.05
(58) Field of Search ........................... 379/67.1, 70, 74, 379/88.13, 88.22, 88.23, 88.24, 88.25, 88.26, 93.02, 93.07, 93.21, 100.12, 185, 187, 199, 68, 76, 93.05, 93.03, 88.01

(56) References Cited

U.S. PATENT DOCUMENTS

| 3,979,560 | A | | 9/1976 | Darwood | 179/6 R |
|---|---|---|---|---|---|
| 4,409,439 | A | * | 10/1983 | Gamble | 179/84 |
| 4,500,753 | A | | 2/1985 | Plunkett | 179/6.03 |
| 4,577,063 | A | | 3/1986 | Hanscom et al. | 179/6.16 |
| 4,644,106 | A | | 2/1987 | Yeh | 379/375 |
| 4,674,115 | A | * | 6/1987 | Kaleita et al. | 379/201 |
| 4,847,895 | A | | 7/1989 | Web | 379/199 |
| 4,924,499 | A | | 5/1990 | Serby | 379/200 |
| 4,975,940 | A | | 12/1990 | Hashimoto | 379/67 |
| 5,081,667 | A | * | 1/1992 | Drori et al. | 379/59 |
| 5,317,632 | A | | 5/1994 | Ellison | 379/199 |
| 5,388,150 | A | * | 2/1995 | Schneyer et al. | 379/67 |
| 5,467,388 | A | * | 11/1995 | Redd, Jr. et al. | 379/196 |
| 5,481,594 | A | * | 1/1996 | Shen et al. | 379/67 |
| 5,483,577 | A | * | 1/1996 | Gulick | 379/67.1 |
| 5,572,576 | A | * | 11/1996 | Klausner et al. | 379/67.1 |
| 5,598,461 | A | * | 1/1997 | Greenberg | 379/67 |
| 5,644,629 | A | * | 7/1997 | Chow | 379/142 |
| 5,727,047 | A | * | 3/1998 | Bently et al. | 379/93 |
| 5,768,363 | A | | 6/1998 | Dautartas et al. | 379/375 |
| 5,812,648 | A | | 9/1998 | Wanner | 379/147 |
| 5,822,402 | A | * | 10/1998 | Marszalek | 379/88.21 |
| 5,930,351 | A | * | 7/1999 | Lappen et al. | 379/373 |
| 5,978,451 | A | * | 11/1999 | Swan et al. | 379/88.24 |
| 6,026,152 | A | * | 2/2000 | Cannon et al. | 379/142 |

FOREIGN PATENT DOCUMENTS

JP            409307606  A   *  11/1997

* cited by examiner

Primary Examiner—Allan Hoosain

(57) ABSTRACT

The invention is a telephone answering device that permits the number of rings before the call is answered, and the speaker volume, to be programmed to vary depending on the time of day and day of the week, or to be set at desired levels for specific lengths of time. The device contains a timer 19 and a microcomputer 10, said microcomputer 10 having a programmable ring register 23 and a programmable speaker register 24. A program ring button 25, a program speaker button 26, a time ring button 27, a time speaker button 28, a plus button 29, and a minus button 30 located on a control module 14 enable the user to access programmable ring register 23 and programmable speaker register 24, to set the number of rings before answering and the speaker volume. Incoming telephone calls are handled by a ring detector circuit 13 and microcomputer 10. When the number of cumulative ring signals matches the appropriate programmed setting, the incoming call is sent to an answering apparatus 18. Microcomputer 10 then sets the volume of a speaker 16 to the appropriate programmed setting, via a volume control circuit 17.

16 Claims, 10 Drawing Sheets

|  | Hour | Minute | Number Of Rings |
|---|---|---|---|
|  | 1 | 2 | 3 |
|  | 4 | 5 | 6 |
| Monday | 7 | 8 | 9 |
|  | 10 | 11 | 12 |
|  | 13 | 14 | 15 |
|  | 16 | 17 | 18 |
|  | 19 | 20 | 21 |
| Tuesday | 22 | 23 | 24 |
|  | 25 | 26 | 27 |
|  | 28 | 29 | 30 |
|  | 31 | 32 | 33 |
|  | 34 | 35 | 36 |
| Wednesday | 37 | 38 | 39 |
|  | 40 | 41 | 42 |
|  | 43 | 44 | 45 |
|  | 46 | 47 | 48 |
|  | 49 | 50 | 51 |
| Thursday | 52 | 53 | 54 |
|  | 55 | 56 | 57 |
|  | 58 | 59 | 60 |
|  | 61 | 62 | 63 |
|  | 64 | 65 | 66 |
| Friday | 67 | 68 | 69 |
|  | 70 | 71 | 72 |
|  | 73 | 74 | 75 |
|  | 76 | 77 | 78 |
|  | 79 | 80 | 81 |
| Saturday | 82 | 83 | 84 |
|  | 85 | 86 | 87 |
|  | 88 | 89 | 90 |
|  | 91 | 92 | 93 |
|  | 94 | 95 | 96 |
| Sunday | 97 | 98 | 99 |
|  | 100 | 101 | 102 |
|  | 103 | 104 | 105 |
| Time & Day of Expiration | 106 | 107 | 108 |
| Length of Time | 109 | 110 | 111 |

Location Numbers

Day of Expiration

Figure 2

|  | Hour | Minute | Speaker Volume |  |
|---|---|---|---|---|
| Monday | 1 | 2 | 3 | |
| | 4 | 5 | 6 | |
| | 7 | 8 | 9 | |
| | 10 | 11 | 12 | |
| | 13 | 14 | 15 | |
| | 16 | 17 | 18 | |
| Tuesday | 19 | 20 | 21 | |
| | 22 | 23 | 24 | |
| | 25 | 26 | 27 | |
| | 28 | 29 | 30 | |
| | 31 | 32 | 33 | |
| | 34 | 35 | 36 | |
| Wednesday | 37 | 38 | 39 | |
| | 40 | 41 | 42 | |
| | 43 | 44 | 45 | |
| | 46 | 47 | 48 | |
| | 49 | 50 | 51 | Location Numbers |
| Thursday | 52 | 53 | 54 | |
| | 55 | 56 | 57 | |
| | 58 | 59 | 60 | |
| | 61 | 62 | 63 | |
| | 64 | 65 | 66 | |
| Friday | 67 | 68 | 69 | |
| | 70 | 71 | 72 | |
| | 73 | 74 | 75 | |
| | 76 | 77 | 78 | |
| | 79 | 80 | 81 | |
| Saturday | 82 | 83 | 84 | |
| | 85 | 86 | 87 | |
| | 88 | 89 | 90 | |
| | 91 | 92 | 93 | |
| | 94 | 95 | 96 | |
| Sunday | 97 | 98 | 99 | |
| | 100 | 101 | 102 | |
| | 103 | 104 | 105 | |
| Time & Day of Expiration | 106 | 107 | 108 | ← Day of Expiration |
| Length of Time | 109 | 110 | 111 | |

Figure 3

Number of Rings Before Answering, For Various Times of Day and Day of Week

| Button Pushed By User | Device Response |
|---|---|
| Program Ring | Monday, First Time, Unset |
| + | 12 A.M. |
| + | 1 A.M. |
| + | 2 A.M. |
| + | 3 A.M. |
| + | 4 A.M. |
| + | 5 A.M. |
| + | 6 A.M. |
| + | 7 A.M. |
| Program Ring | O'Clock |
| + | :01 |
| + | :02 |
| + | :03 |
| + | :04 |
| + | :05 |
| Program Ring | 4 Rings |
| - | 3 Rings |
| - | 2 Rings |
| Program Ring | Monday, Second Time, Unset |

(Monday's remaining times and associated number of rings, as well as those for the remainder of the week, are programmed in a similar manner to that described above)

Number of Rings Before Answering, For a Specific Length of Time

| Button Pushed By User | Device Response |
|---|---|
| Time Ring | Unset |
| + | 0 Hours |
| + | 1 Hour |
| + | 2 Hours |
| Time Ring | 0 Minutes |
| + | 1 Minute |
| + | 2 minutes |
| + | 3 minutes |
| + | 4 minutes |
| + | 5 minutes |
| Time Ring | 4 Rings |
| - | 3 Rings |
| - | 2 Rings |
| Time Ring | 2 Hours, 5 Minutes, 2 Rings |

Figure 4

Speaker Volume, For Various Times of Day and Day of Week

| Button Pushed By User | Device Response |
|---|---|
| Program Speaker | Monday, First Time, Unset |
| + | 12 A.M. |
| + | 1 A.M. |
| + | 2 A.M. |
| + | 3 A.M. |
| + | 4 A.M. |
| + | 5 A.M. |
| + | 6 A.M. |
| + | 7 A.M. |
| Program Speaker | O'Clock |
| + | :01 |
| + | :02 |
| + | :03 |
| + | :04 |
| + | :05 |
| Program Speaker | Level 5 |
| - | Level 4 |
| - | Level 3 |
| Program Speaker | Monday, Second Time, Unset |

(Monday's remaining times and associated speaker volume levels, as well as those for the remainder of the week, are programmed in a similar manner to that described above)

Speaker Volume, For a Specific Length of Time

| Button Pushed By User | Device Response |
|---|---|
| Time Speaker | Unset |
| + | 0 Hours |
| + | 1 Hour |
| + | 2 Hours |
| Time Speaker | 0 Minutes |
| + | 1 Minute |
| + | 2 minutes |
| + | 3 minutes |
| + | 4 minutes |
| + | 5 minutes |
| Time Speaker | Level 5 |
| - | Level 4 |
| - | Level 3 |
| Time Speaker | 2 Hours, 5 Minutes, Level 3 |

TELEPHONE ANSWERING DEVICE WITH TIMER CONTROL

BACKGROUND

CROSS-REFERENCES TO RELATED APPLICATIONS

Not applicable; omitted.

1. Field of Invention

This invention is in the area of telephone answering devices, specifically a telephone answering device that permits the number of rings before the call is answered, and the speaker volume, to be programmed to vary depending on the time of day and day of the week, or to be set at desired levels for specific lengths of time.

2. Discussion of Prior Art

When a person does not wish to be disturbed, receiving telephone calls can be inconvenient and disruptive. One example of this is a telephone call received late at night, when children or others are asleep. Sleeping children or others are often awoken by multiple rings of a telephone, particularly if a telephone extension is located in or near their bedrooms.

A second example occurs when a home has a second telephone line, which is used to receive business calls in a home office. It is inconvenient to have the business line ring multiple times in the evening, when a person does not wish to answer the call.

Various approaches have been taken to address this problem:

A person can simply turn off the ringer to the telephone. However, if several telephones are located in the vicinity of a sleeping child, a person would have to turn off the ringer on each telephone to achieve the desired level of quiet. In addition, the person must remember to turn the ringers back on. Further, if the ringer or ringers are turned off, a person does not receive any notification that an incoming call has occurred.

Telephone ring silencers connected to a timer or clock have also been developed, and are shown in U.S. Pat. No. 4,924,499 to Serby, U.S. Pat. No. 5,317,632 to Ellison, U.S. Pat. No. 5,768,363 to Dautartas et al., and U.S. Pat. No. 5,812,648 to Wanner.

However, a person would have to deploy these silencers on all phones in a home or office to be effective, and this would be complex and costly. Even if a single timed ring silencer were used for an entire home or office, as suggested in Dautartas et al., the device would need to be located at a central interface. Access to this central interface might be difficult, which would make re-programming the device inconvenient.

Further, when the ring silencing devices of Serby, Ellison, or Wanner are engaged, a person does not receive any notification that an incoming call has occurred with the device of Dautartas et al., a person either doesn't hear the ringing at all if the volume is set below the audible level—thus receiving no notification that an incoming call has occurred; or still hears the ringing, however muted, for the usual length of time.

Prior art telephone answering devices are not a satisfactory solution either, since these devices let the phone ring for a predetermined number of rings (usually 2 or 4) before answering the call, no matter what the time of day of day of the week. U.S. Pat. No. 3,979,560 to Darwood shows an example of such an answering device, with a ring detector (the commonly known toll-saver feature). However, this and other prior art answering devices do not permit the number of rings before the call is answered to vary depending on the time of day or day of the week.

Similarly, prior art telephone answering devices do not permit the volume of the device's speaker to be pre-programmed to vary depending on the time of day or day of the week—instead, speaker volume must be manually adjusted up and down. To avoid disturbing sleep, a lower speaker volume is generally preferred late at night. However, a person may turn down the speaker volume during the evening to an inaudible level and then forget to turn it back up. This can cause much fumbling to quickly turn up the volume when screening an incoming call the next day.

Thus, it can be seen that an answering device with features that permit the number of rings before the call is answered, and the speaker volume, to be programmed to vary depending on the time of day and day of the week, or to be programmed at desired levels for specific lengths of time, would be a significantly useful improvement over the prior art.

OBJECTS AND ADVANTAGES

Accordingly, several objects and advantages of my invention are:

My invention takes a new and different approach to solving the problem of undesired telephone ringing, by providing a way to program, for different times of day and days of the week or for a specific length of time, the number of rings after which a telephone answering device will answer a call as well as the volume level of the device's speaker.

Users can vary exactly how long the telephone will ring before the answering device answers the call. During the day, a longer ringing period would likely be desired, to allow maximum time for users to answer a call themselves. However, during the evening it can be desirable to limit the number of rings before the answering device answers to one ring, or even no rings, to avoid disturbing sleeping individuals. Additionally, the user can set the number of rings before answering at a desired number for a specific length of time. This is advantageous when the user does not wish the telephone to ring multiple times during a meeting, or when carrying a cellular phone into a movie or other event, but nonetheless wishes to receive some notification that an incoming call has occurred.

Similarly, users can vary exactly how loud the speaker volume will be, once the answering device answers the call. During the day, a louder speaker volume would likely be desired, to maximize the ability to screen the call or hear the replayed message over typical daytime home or office noise. However, during the evening it can be desirable to limit the speaker volume, to avoid disturbing sleeping individuals. Additionally, the user can set the speaker volume at a desired level for a specific length of time. This is advantageous when the user does not wish an answering device message to intrude too loudly during a meeting, but nonetheless wishes to hear the message.

Unlike telephone ring silencers shown in the prior art, my invention allows a user to be notified, for example by a single ring, that an incoming call has occurred, without being disturbed by multiple rings. If desired, the user can then check to see if the call was of an emergency nature.

Unlike telephone ring silencers shown in the prior art, my invention does not require a device to be placed on each telephone—my device stops the ring on every telephone in a home or office by answering the call after the appropriate number of rings for a given time of day and day of the week. My invention is thus a lower cost, less complex option than those prior art ring silencers.

Versus centrally located telephone ring silencers suggested in the prior art, my invention can be more conveniently located within a home or office, and thus would be more readily accessible for re-programming as needed.

It is flexible—the device can be programmed to accommodate any number of different lifestyles, work and sleep schedules, vacation periods, etc.

The programmed mode for the number of rings after which the device answers a call, and the speaker volume, can be easily turned off via the switches shown in my invention. Thus, the number of rings and speaker volume may be controlled manually for a certain time, and then returned easily to programmed mode.

The concepts embodied in my invention—being able to program the number of rings after which a telephone answering device will answer a call, and the speaker volume level, for different times of day and days of the week or for a specific length of time, are applicable to many different types of telephone answering devices and communication devices, including conventional stand-alone answering machines, software program-based answering systems, cellular and satellite telephones connected to answering devices or systems, and telephones connected to voice mail systems. In addition, my invention can be used with either digital or tape-based answering devices, or with devices using other types of storage media.

Further objects and advantages of my invention will become apparent from a consideration of the drawings and ensuing description.

DESCRIPTION OF DRAWINGS

The reader will note that several components, such as the basic answering apparatus and ring detector circuit, are available in the prior art. Accordingly, these components are not shown in detail in the drawings, but rather depicted with appropriately labeled boxes.

FIG. 2 details the composition of the programmable ring register contained in the microcomputer of the device.

FIG. 3 details the composition of the programmable speaker register contained in the microcomputer of the device.

FIG. 4 outlines the procedure used to program the number of rings before answering, for desired times of day and days of the week or for a specific length of time.

FIG. 5 outlines the procedure used to program the speaker volume, for desired times of day and days of the week or for a specific length of time.

LIST OF REFERENCE NUMERALS

Figure 1:
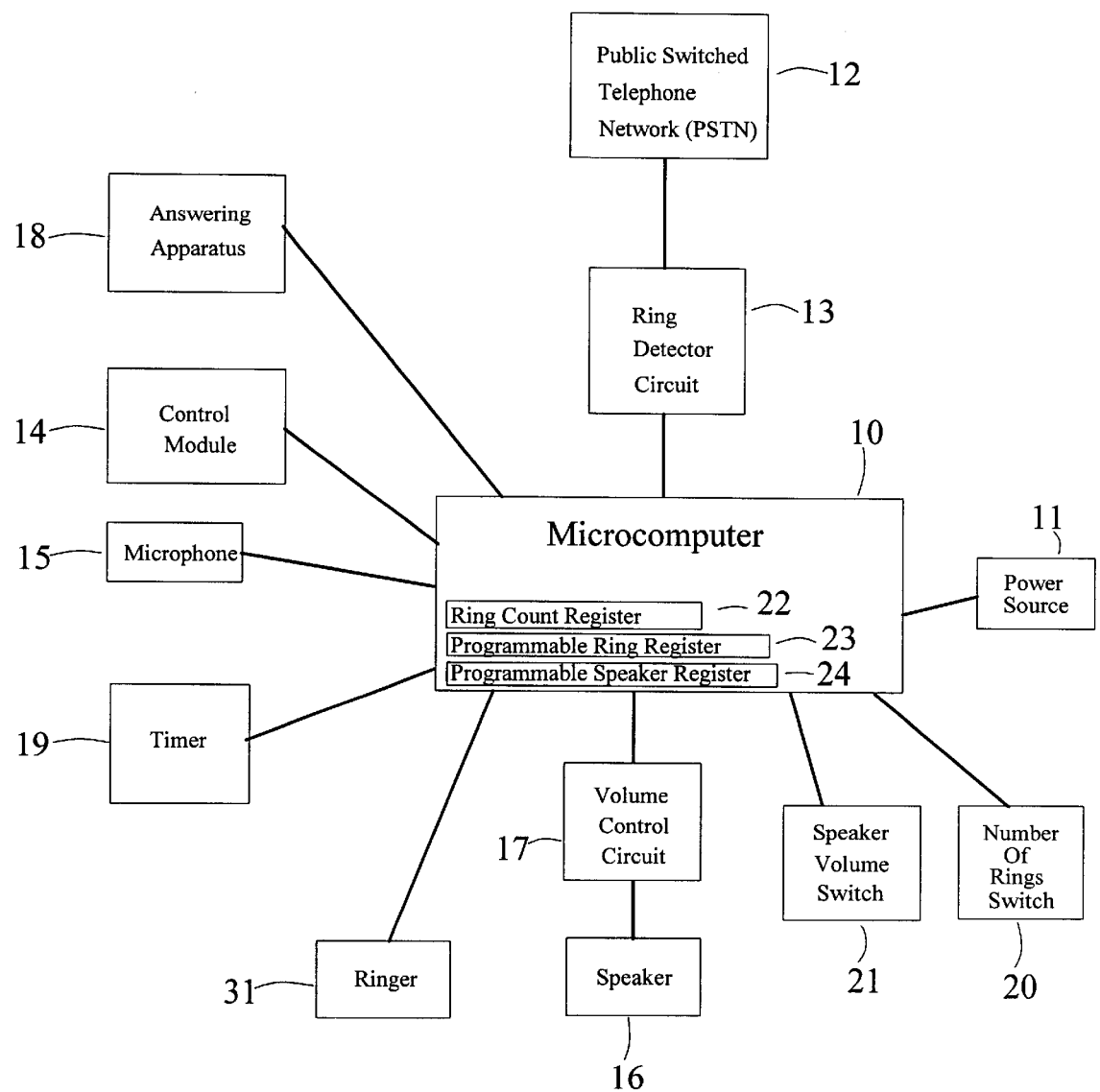
FIG. 1 illustrates the primary components of the invention.

10. Microcomputer
11. Power source
12. Public switched telephone network (PSTN)
13. Ring detector circuit
14. Control module
15. Microphone
16. Speaker
17. Volume control circuit
18. Answering apparatus
19. Timer
20. Number of rings switch
21. Speaker volume switch
22. Ring count register
23. Programmable ring register (contains 111 data storage locations)
24. Programmable speaker register (contains 111 data storage locations)
25. Program ring button
26. Program speaker button
27. Time ring button
28. Time speaker button
29. Plus button
30. Minus button
31. Ringer

SUMMARY

My invention is a telephone answering device that permits the number of rings before the call is answered, and the speaker volume, to be programmed to vary depending on the time of day and day of the week, or to be set at desired levels for specific lengths of time.

DESCRIPTION—MAIN EMBODIMENT

The reader will note that several components, such as the basic answering apparatus and ring detector circuit, are available in the prior art. Accordingly, these components are not described in detail, but rather referred to with appropriately descriptive terms.

As shown in FIG. 1, a microcomputer 10, connected to a power source 11, is at the heart of my invention. Microcomputer 10 is connected to a public switched telephone network (PSTN) 12 through a ring detector circuit 13.

A control module 14, a microphone 15, a speaker 16 with a volume control circuit 17, and an answering apparatus 18 are connected to microcomputer 10.

Said control module 14 and microphone 15 allow a user to program the number of rings before a call is answered, for various times of day and days of the week or for a specific length of time; program the speaker volume, for various times of day and days of the week or for a specific length of time; record an outgoing message; play back received messages; set the time and day of the week; control remote access; and generally perform other tasks associated with operating a telephone answering device.

Said speaker 16 and volume control circuit 17 provide the means by which a user can listen to an outgoing message, an incoming call, or a previously recorded call.

Said answering apparatus 18 provides the means and the memory necessary for the recording, storing, and playing back of outgoing messages and incoming calls.

Figure 6:
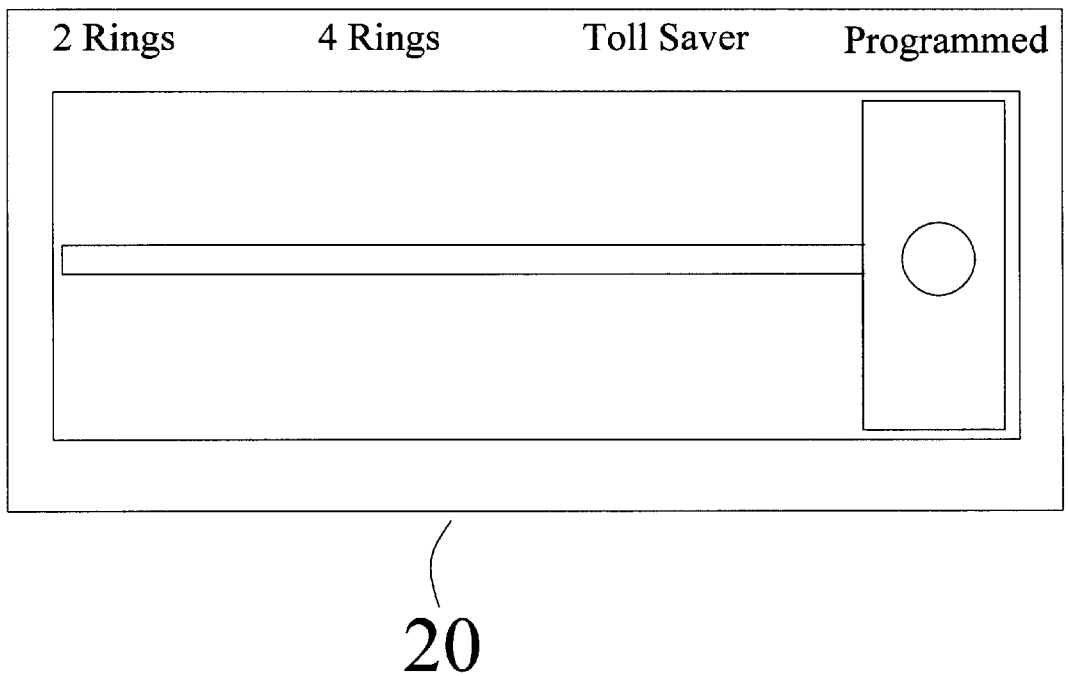
FIG. 6 illustrates the number of rings switch, with its two ring, four ring, toll saver, and programmed positions.
Figure 7:
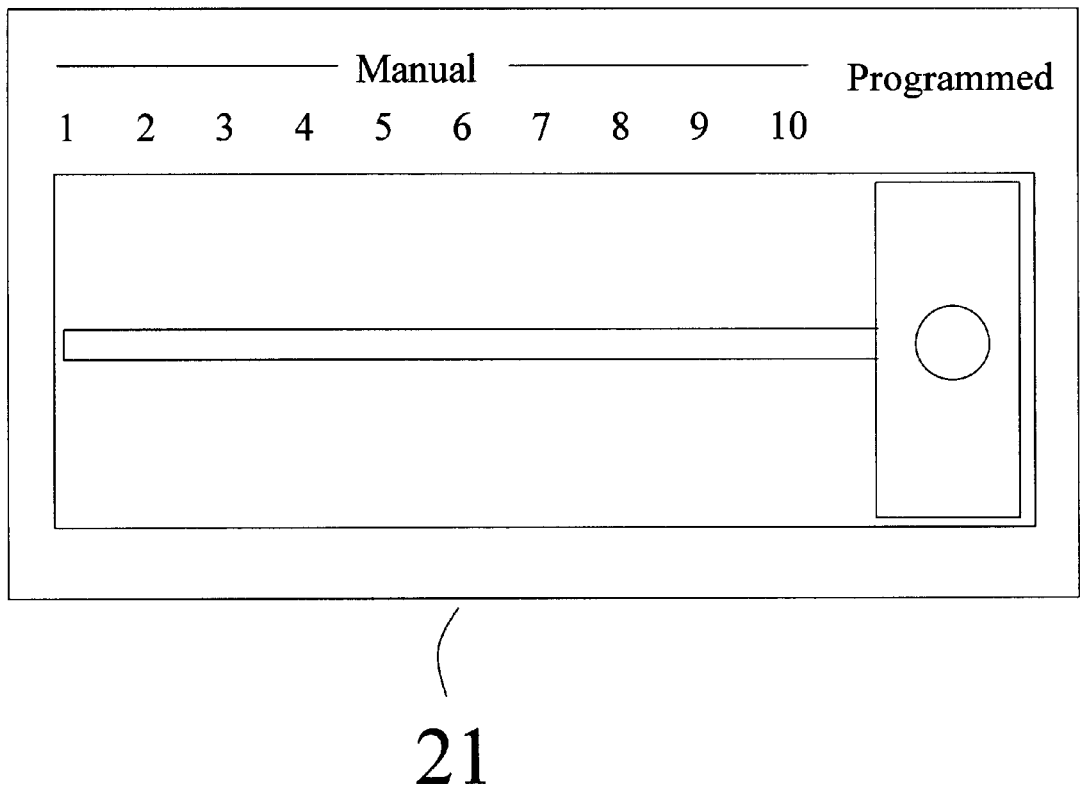
FIG. 7 illustrates the speaker volume switch, with its manual and programmed positions.

A timer 19, a number of rings switch 20, a speaker volume switch 21, and a ringer 31 are connected to microcomputer 10. Said timer 19 is set via control module 14 and maintains the current time of day and day of the week. Said number of rings switch 20, further illustrated in FIG. 6, has two ring, four ring, toll saver, and programmed positions. Said speaker volume switch 21, further illustrated in FIG. 7, has a programmed position and manual positions labeled one to ten. Said ringer 31 notifies the user that an incoming call is occurring.

Microcomputer 10 contains a ring count register 22, used for counting the number of ring signals from an incoming telephone call; a programmable ring register 23, which maintains the desired number of rings before answering for various times of day and days of the week or for a specific length of time; and a programmable speaker register 24, which maintains the desired speaker volume for various times of day and days of the week or for a specific length of time.

FIG. 2 details the composition of programmable ring register 23, and FIG. 3 details the composition of programmable speaker register 24. Said programmable registers 23 and 24 each have one hundred eleven locations—fifteen locations for each of the seven days of the week, and six additional locations to enable setting the number of rings before answering or speaker volume for a specific length of time. The user can specify five separate times for each day of the week, and an associated number of rings before answering or speaker volume for each of those five times. Additionally, the user can specify a length of time during which the number of rings before answering, or the speaker volume, will be set at a desired level.

Figure 8:
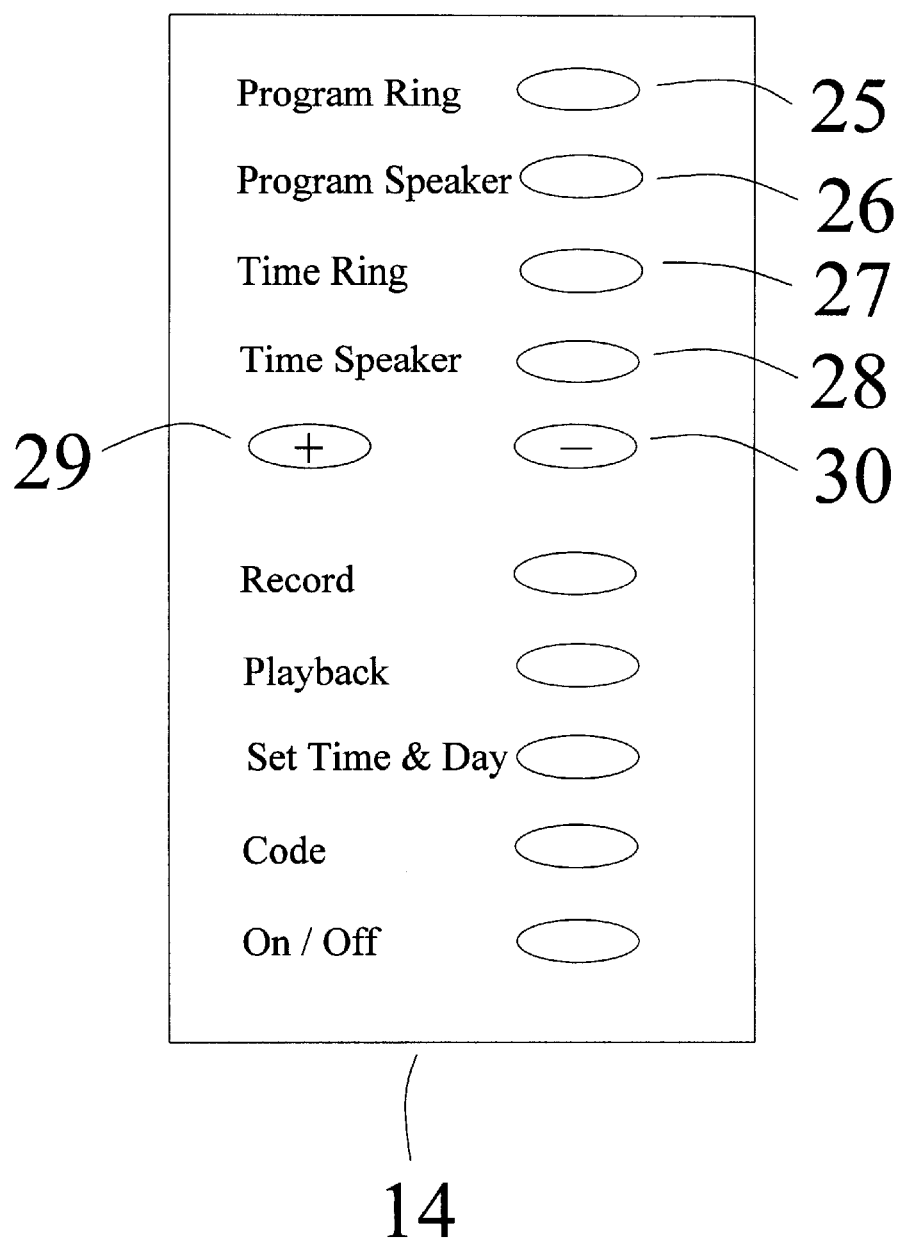
FIG. 8 details the buttons on the control module that enable the setting of the number of rings and speaker volume.

FIG. 8 details control module 14, particularly the portion that enables the setting of the number of rings before answering and the speaker volume. Control module 14 has a program ring button 25, a program speaker button 26, a time ring button 27, and a time speaker button 28. Control module 14 also includes buttons for recording an outgoing message, playing back received messages, setting the time and day, setting a remote access code, and turning the device on and off. These features are available in the prior art, and so are not described in detail.

OPERATION—MAIN EMBODIMENT

INITIAL PROGRAMMING

Number of Rings Before Answering, For Various Times of Day & Days of Week:

As shown in FIGS. 4 and 8, using control module 14, the user pushes program ring button 25. The device responds, through speaker 16, with "Monday, First Time, Unset". The user pushes plus button 29 or minus button 30 as needed to select the desired hour, then pushes program ring button 25 again to store the desired hour in location 1 of programmable ring register 23. The device responds with "O' Clock". The user pushes plus button 29 or minus button 30 as needed to select the desired minute, then pushes program ring button 25 again to store the desired minute in location 2 of programmable ring register 23. The device responds with "Four Rings". The user pushes plus button 29 or minus button 30 as needed to select the desired number of rings, then pushes program ring button 25 again to store the desired number of rings in location 3 of programmable ring register 23. The device responds with "Monday, Second Time, Unset". The user programs Monday's remaining times and associated number of rings, as well as those for the remainder of the week, in a similar manner to that described above and shown in FIG. 4. The user can leave any given day and time unset by simply pushing program ring button 25 after receiving the "Unset" response. The device will advance to the next time slot.

Speaker Volume, For Various Times of Day & Days of Week:

As shown in FIGS. 5 and 8, using control module 14, the user pushes program speaker button 26. The device responds, through speaker 16, with "Monday, First Time, Unset". The user pushes plus button 29 or minus button 30 as needed to select the desired hour, then pushes program speaker button 26 again to store the desired hour in location 1 of programmable speaker register 24. The device responds with "O' Clock". The user pushes plus button 29 or minus button 30 as needed to select the desired minute, then pushes program speaker button 26 again to store the desired minute in location 2 of programmable speaker register 24. The device responds with "Level Five". The user pushes plus button 29 or minus button 30 as needed to select the desired speaker volume level, then pushes program speaker button 26 again to store the desired speaker volume in location 3 of programmable speaker register 24. The device responds with "Monday, Second Time, Unset". The user programs Monday's remaining times and associated speaker volume levels, as well as those for the remainder of the week, in a similar manner to that described above and shown in FIG. 5. The user can leave any given day and time unset by simply pushing program speaker button 26 after receiving the "Unset" response. The device will advance to the next time slot.

Number of Rings Before Answering. For a Specific Length of Time:

As shown in FIGS. 4 and 8, using control module 14, the user pushes time ring button 27. The device responds, through speaker 16, with "Unset". The user pushes plus button 29 or minus button 30 as needed to select the desired number of hours, then pushes time ring button 27 again to store the desired number of hours in location 109 of programmable ring register 23. The device responds with "zero minutes". The user pushes plus button 29 or minus button 30 as needed to select the desired number of minutes, then pushes time ring button 27 again to store the desired number of minutes in location 110 of programmable ring register 23. The device responds with "Four Rings". The user pushes plus button 29 or minus button 30 as needed to select the desired number of rings, then pushes time ring button 27 again to store the desired number of rings in location 111 of programmable ring register 23. The device then responds by confirming the specified length of time and associated number of rings.

At the end of the above process, microcomputer 10 polls timer 19 for the current time and day, compares the current time and day with the specified length of time, and computes the hour, minute, and day at which the specified length of time will expire. Microcomputer 10 then enters that hour, minute, and day of expiration into locations 106, 107, and 108 respectively of programmable ring register 23, and clears locations 109 and 110 of programmable ring register 23.

Speaker Volume, For a Specific Length of Time:

As shown in FIGS. 5 and 8, using control module 14, the user pushes time speaker button 28. The device responds, through speaker 16, with "Unset". The user pushes plus button 29 or minus button 30 as needed to select the desired number of hours, then pushes time speaker button 28 again to store the desired number of hours in location 109 of programmable speaker register 24. The device responds with "zero minutes". The user pushes plus button 29 or minus button 30 as needed to select the desired number of minutes, then pushes time speaker button 28 again to store the desired number of minutes in location 110 of programmable speaker register 24. The device responds with "Level Five". The user pushes plus button 29 or minus button 30 as needed to select the desired speaker volume level, then pushes time speaker button 28 again to store the desired speaker volume in location 111 of programmable speaker register 24. The device then responds by confirming the specified length of time and associated speaker volume.

At the end of the above process, microcomputer 10 polls timer 19 for the current time and day, compares the current time and day with the specified length of time, and computes the hour, minute, and day at which the specified length of time will expire. Microcomputer 10 then enters that hour, minute, and day of expiration into locations 106, 107, and 108 respectively of programmable speaker register 24, and clears locations 109 and 110 of programmable speaker register 24.

REVIEWING OR RE-PROGRAMMING SETTINGS

Number of Rings Before Answering, For Various Times of Day & Days of Week:

Pushing program ring button 25, after initial programming, allows the user to review or re-program the settings. The device responds, through speaker 16, with "Monday, First Time", and the associated hour setting. The user can maintain that hour setting by pushing program ring button 25 again. The device responds with the associated minute setting. The user can maintain that minute setting by pushing program ring button 25 again. The device responds with the associated number of rings setting. The user can maintain that number of rings setting by pushing program ring button 25 again. The device responds with "Monday, Second Time", and the associated hour setting.

In this manner, the user can step through the currently programmed settings for number of rings before answering. The user can re-program any setting easily, by pushing plus button 29 or minus button 30 as needed during the review process described above.

The user can also return any of a day's five available time slots to the unset position, then push program ring button 25 to advance the device to the next time slot. The unset position is re-accessed via plus button 29 and minus button 30. This is advantageous, for example, if the user initially used four out of the five available time slots for a given day, but later decided to use only two out of the five. Re-programming the device to reflect such a change is facilitated by the ability to return a time slot to an unset position, since the user does not have to re-program the undesired time slot to match one of the remaining, desired time slots.

Speaker Volume. For Various Times of Day & Days of Week:

Pushing program speaker button 26, after initial programming, allows the user to review or re-program the settings. The device responds, through speaker 16, with "Monday, First Time", and the associated hour setting. The user can maintain that hour setting by pushing program speaker button 26 again. The device responds with the associated minute setting. The user can maintain that minute setting by pushing program speaker button 26 again. The device responds with the associated speaker volume setting.

The user can maintain that speaker volume setting by pushing program speaker button 26 again. The device responds with "Monday, Second Time", and the associated hour setting.

In this manner, the user can step through the currently programmed settings for speaker volume. The user can re-program any setting easily, by pushing plus button 29 or minus button 30 as needed during the review process described above.

The user can also return any of a day's five available time slots to the unset position, then push program speaker button 26 to advance the device to the next time slot. The unset position is re-accessed via plus button 29 and minus button 30. This is advantageous, for example, if the user initially used four out of the five available time slots for a given day, but later decided to use only two out of the five. Re-programming the device to reflect such a change is facilitated by the ability to return a time slot to an unset position, since the user does not have to re-program the undesired time slot to match one of the remaining, desired time slots.

Number of Rings Before Answering. For a Specific Length of Time:

Pushing time ring button 27, after initial programming, allows the user to review or change the remaining length of time, or the number of rings before answering. First, microcomputer 10 polls timer 19 for the current time and day, compares the current time and day with the hour, minute, and day of expiration in locations 106, 107, and 108 respectively of programmable ring register 23, and computes the remaining hours and minutes before the timed ring will expire. Microcomputer 10 then enters those remaining hours and minutes into locations 109 and 110 in programmable ring register 23. The device then responds, through speaker 16, with the number of remaining hours. The user can maintain that hour setting by pushing time ring button 27 again. The device responds with the number of remaining minutes. The user can maintain that minute setting by pushing time ring button 27 again. The device responds with the associated setting for number of rings. The user can maintain that number of rings setting by pushing time ring button 27 again.

In this manner, the user can step through the current remaining hours and minutes, and the associated number of rings before answering. The user can re-program any setting easily, by pushing plus button 29 or minus button 30 as needed during the review process described above. The user can also cancel the timed ring by returning the hour setting to an unset position, or by simply changing both the hour and minute settings to zero.

At the end of the review/re-programming process, microcomputer 10 polls timer 19 for the current time and day, compares the current time and day with the newly specified length of time, and computes the hour, minute, and day at which the newly specified length of time will expire. Microcomputer 10 then enters that hour, minute, and day of expiration into locations 106, 107, and 108 respectively of programmable ring register 23, and clears locations 109 and 110 of programmable ring register 23.

Speaker Volume, For a Specific Length of Time:

Pushing time speaker button 28, after initial programming, allows the user to review or change the remaining length of time, or the speaker volume level. First, microcomputer 10 polls timer 19 for the current time and day, compares the current time and day with the hour, minute, and day of expiration in locations 106, 107, and 108 respectively of programmable speaker register 24, and computes the remaining hours and minutes before the timed speaker will expire. Microcomputer 10 then enters those remaining hours and minutes into locations 109 and 110 of programmable speaker register 24. The device then responds, through speaker 16, with the number of remaining hours. The user can maintain that hour setting by pushing time speaker button 28 again. The device responds with the number of remaining minutes. The user can maintain that minute setting by pushing time speaker button 28 again. The device responds with the associated setting for speaker volume. The user can maintain that speaker volume setting by pushing time speaker button 28 again.

In this manner, the user can step through the current remaining hours and minutes, and the associated speaker volume. The user can re-program any setting easily, by pushing plus button 29 or minus button 30 as needed during the review process described above. The user can also cancel the timed speaker by returning the hour setting to an unset position, or by simply changing both the hour and minute settings to zero.

At the end of the review/re-programming process, microcomputer 10 polls timer 19 for the current time and day, compares the current time and day with the newly specified length of time, and computes the hour, minute, and day at which the newly specified length of time will expire. Microcomputer 10 then enters that hour, minute, and day of expiration into locations 106, 107, and 108 respectively of programmable speaker register 24, and clears locations 109 and 110 of programmable speaker register 24.

Hours are stored in military time in programmable ring register 23 and programmable speaker register 24. For example, 1 PM would be stored as the value 13. Microcomputer 10 translates to and from military time during programming, re-programming, and call handling, so that the storage of hours in military time is not apparent to the user.

HANDLING OF INCOMING TELEPHONE CALLS

Figure 9:
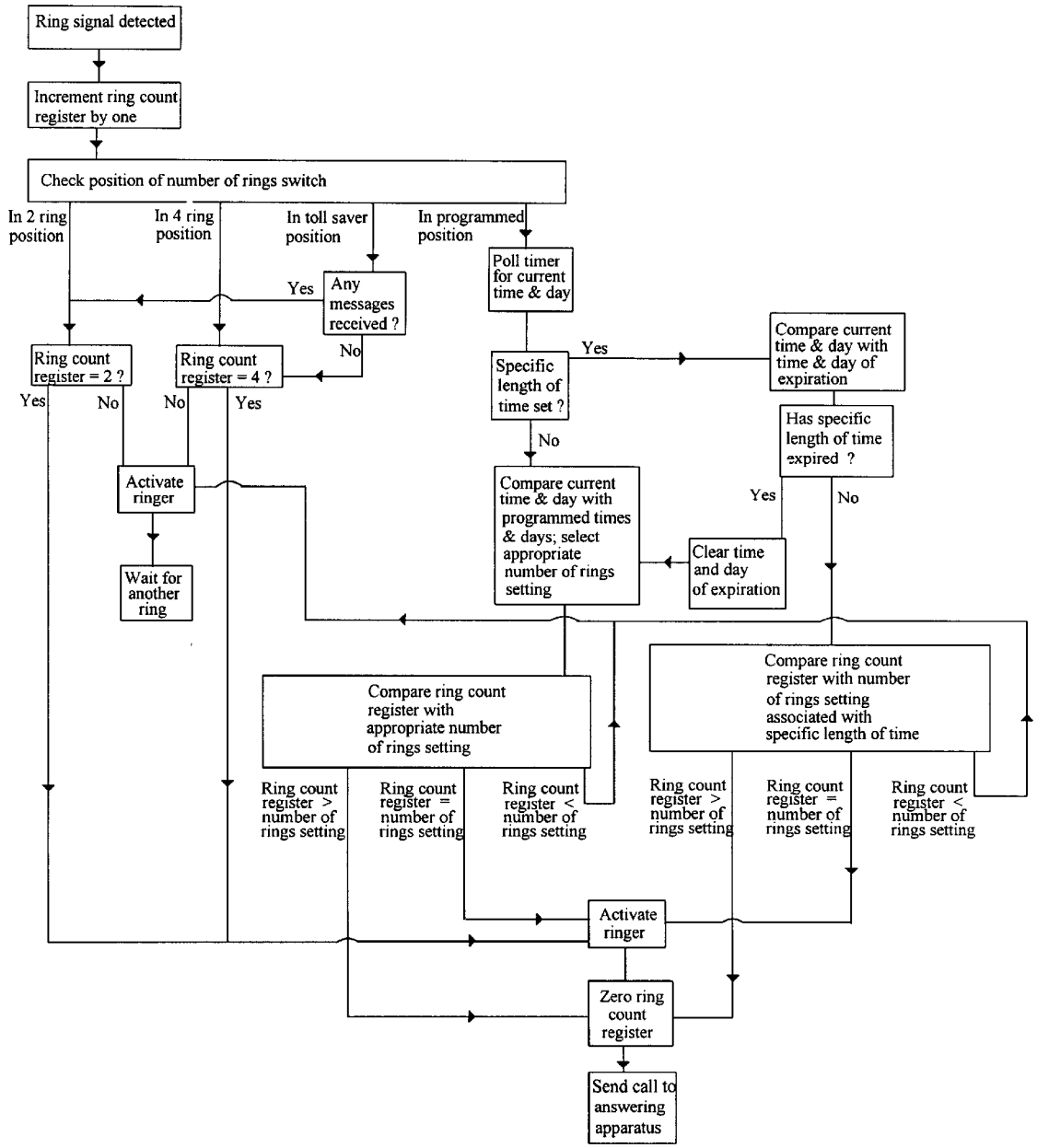
FIG. 9 illustrates the steps involved in handling incoming telephone calls, specifically the handling of programmable number of rings.

As detailed in FIG. 9, ring detector circuit 13 detects an incoming ring signal and increments ring count register 22 in microcomputer 10 by one. Microcomputer 10 then checks the position of number of rings switch 20.

If number of rings switch 20 is in the two ring position, microcomputer 10 compares ring count register 22 with the value two. If ring count register 22 equals two, microcomputer 10 activates ringer 31, sets ring count register 22 to zero, and sends the incoming call to answering apparatus 18. If ring count register 22 does not equal two, microcomputer 10 activates ringer 31 and waits for another ring signal.

If number of rings switch 20 is in the four ring position, microcomputer 10 compares ring count register 22 with the value four. If ring count register 22 equals four, microcomputer 10 activates ringer 31, sets ring count register 22 to zero, and sends the incoming call to answering apparatus 18. If ring count register 22 does not equal four, microcomputer 10 activates ringer 31 and waits for another ring signal.

If number of rings switch 20 is in the toll saver position, microcomputer 10 checks whether any messages have been received and not yet reviewed.

If messages have been received and not yet reviewed, microcomputer 10 compares ring count register 22 with the value two. If ring count register 22 equals two, microcomputer 10 activates ringer 31, sets ring count register 22 to zero, and sends the incoming call to answering apparatus 18. If ring count register 22 does not equal two, microcomputer 10 activates ringer 31 and waits for another ring signal.

If no messages have been received, microcomputer 10 compares ring count register 22 with the value four. If ring count register 22 equals four, microcomputer 10 activates ringer 31, sets ring count register 22 to zero, and sends the incoming call to answering apparatus 18. If ring count register 22 does not equal four, microcomputer 10 activates ringer 31 and waits for another ring signal.

If number of rings switch 20 is in the programmed position, microcomputer 10 polls timer 19 for the current time and day. Microcomputer 10 then checks locations 106, 107, and 108 of programmable ring register 23, to see if the number of rings has been set for a specific length of time.

If the number of rings has been set for a specific length of time, microcomputer 10 compares the current time and day with locations 106, 107, and 108 of programmable ring register 23, to see if the length of time has expired.

If the length of time has not expired, microcomputer 10 compares ring count register 22 with location 111 of programmable ring register 23.

If ring count register 22 is greater than location 111 of programmable ring register 23, microcomputer 10 sets ring count register 22 to zero, and sends the incoming call to answering apparatus 18.

If ring count register 22 equals location 111 of programmable ring register 23, microcomputer 10 activates ringer 31, sets ring count register 22 to zero, and sends the incoming call to answering apparatus 18.

If ring count register 22 is less than location 111 of programmable ring register 23, microcomputer 10 activates ringer 31, and waits for another ring signal.

If the number of rings has not been set for a specific length of time, or the length of time has expired (in which case microcomputer 10 also clears locations 106, 107, and 108 of programmable ring register 23), microcomputer 10 compares the current time and day with the programmed times in programmable ring register 23, selects the appropriate number of rings location in programmable ring register 23, and compares that location with ring count register 22.

If ring count register 22 is greater than the appropriate number of rings location in programmable ring register 23, microcomputer 10 sets ring count register 22 to zero, and sends the incoming call to answering apparatus 18.

If ring count register 22 equals the appropriate number of rings location in programmable ring register 23, microcomputer 10 activates ringer 31, sets ring count register 22 to zero, and sends the incoming call to answering apparatus 18.

If ring count register 22 is less than the appropriate number of rings location in programmable ring register 23, microcomputer 10 activates ringer 31, and waits for another ring signal.

Figure 10:
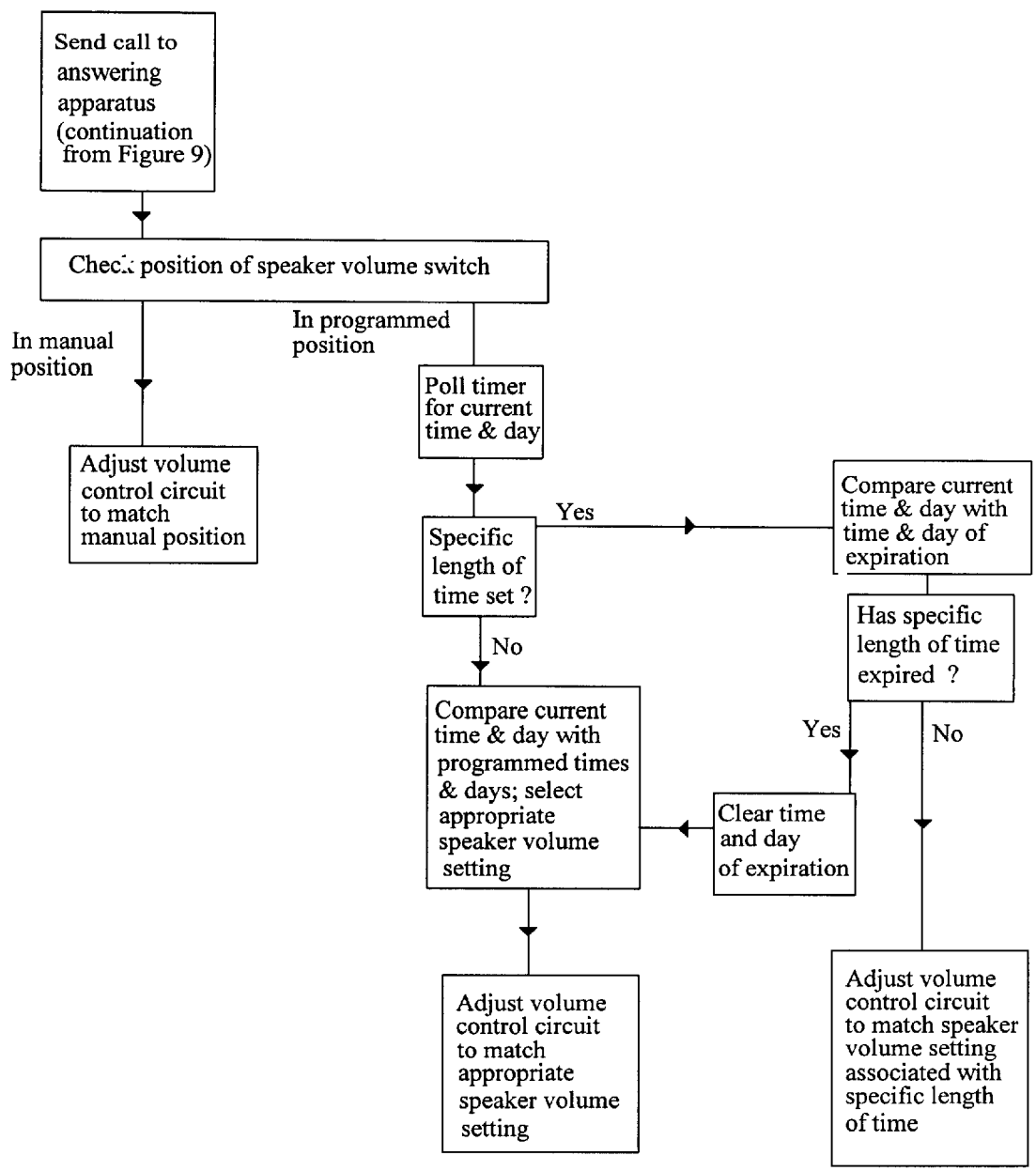
FIG. 10 illustrates the steps involved in handling incoming telephone calls, specifically the handling of programmable speaker volume.

As detailed in FIG. 10, once microcomputer 10 has sent an incoming call to answering apparatus 18, microcomputer 10 checks the position of speaker volume switch 21.

If speaker volume switch 21 is in a manual position, microcomputer 10 adjusts volume control circuit 17 to match the manual setting.

If speaker volume switch 21 is in the programmed position, microcomputer 10 polls timer 19 for the current time and day. Microcomputer 10 then checks locations 106, 107, and 108 of programmable speaker register 24, to see if the speaker volume has been set for a specific length of time.

If the speaker volume has been set for a specific length of time, microcomputer 10 compares the current time and day with locations 106, 107, and 108 of programmable speaker register 24, to see if the length of time has expired.

If the length of time has not expired, microcomputer 10 adjusts volume control circuit 17 to match the setting in location 111 of programmable speaker register 24.

If the speaker volume has not been set for a specific length of time, or the length of time has expired (in which case microcomputer 10 also clears locations 106, 107, and 108 of programmable speaker register 24), microcomputer 10 compares the current time and day of week with the programmed times in programmable speaker register 24, selects the appropriate speaker volume location in programmable speaker register 24, and adjusts volume control circuit 17 to match the setting in the appropriate location of programmable speaker register 24.

If a hang-up condition is detected during the operation of the device, for example when a caller hangs up during the ringing process, or when a caller hangs up after recording a message, microcomputer 10 sets ring count register 22 to zero, and waits for the next incoming call.

CONCLUSIONS, RAMIFICATIONS, AND SCOPE

Thus the reader will see that this invention allows users to program a telephone answering device to more closely suit their lifestyle or work needs.

While my above description contains many specificities, these shall not be construed as limitations on the scope of the invention, but rather as an exemplification of one preferred embodiment thereof. Many other variations are possible. For example:

- The concepts embodied in my invention—being able to program the number of rings after which a telephone answering device will answer a call, and the speaker volume level, for different times of day and days of the week or for a specific length of time, are applicable to many different types of telephone answering devices and communication devices, other than the answering machine shown as the main embodiment. For example, the invention is also applicable to software program-based answering systems, cellular and satellite telephones connected to answering devices or systems, and telephones connected to voice mail systems. My invention can also used with either digital or tape-based answering devices, or with devices using other types of storage media.
- Components shown separately in the invention can be combined together. For example, the timer and answering apparatus can be incorporated into the microcomputer.
- Elements of the microcomputer can be located within other components of the invention. For example, the ring count register can be integrated into the ring detector circuit.
- Alternative means of setting the number of rings or speaker volume for a specified length of time can be envisioned. One example entails the use of a timer which, once set, counts down the remaining hours and minutes, then notifies the microcomputer when the specified length of time has expired.
- The manner in which the device is programmed for various times and days of the week, or for a specified length of time, can be different from the programming steps shown in FIGS. 4 and 5. A few examples follow:
- The order of the programming steps an be different.
- Various portions of the programming sequences can be combined or made separate.
- More or fewer buttons can be incorporated into the control module, such as when multiple buttons that perform separate functions are combined into one multi-functional button.
- A different number of separate times, say three or ten, could be set for each day of the week, versus the five separate times shown in the main embodiment. Conversely, for simplicity the device can have only weekday and weekend modes, instead of allowing each day to be set separately.
- When the invention is applied to a software program-based answering system, the programming can be done via a screen configured for that purpose.
- The programmable registers, used for storing the settings for number of rings before answering and speaker volume, can be configured in different ways. For example, the programmable registers can have more or fewer locations, depending on how much data is stored. There can be more than two programmable registers, or one larger programmable register containing all the necessary data.
- Since the invention provides the ability to program the number of rings before answering and speaker for specific periods of time, a "vacation" or "hold" mode can easily be added. This would enable the user to set the number of rings before answering, and the speaker volume, for a specified number of days or until cancelled.
- The means of signaling the user that an incoming telephone call is occurring can be visual, for example a flashing light, instead of the audible ringer shown in the main embodiment.
- The "device response" shown in FIGS. 4 and 5 can be a visual response, such as a light-emitting-diode display, or it can be both an audio and visual response.
- The device can be accessed, programmed, and re-programmed from a remote location, through the use of a remote access code.
- The number of rings switch and the speaker volume switch can be eliminated, and the functions of those switches can be instead performed by a sequence of programming steps.

Accordingly, the scope of the invention should be determined not by the embodiments illustrated, but by the appended claims and their legal equivalents.

I claim:

1. A communications device, comprising:

a) detecting means for discovering one or more signals from an incoming communication, and b) means for ascertaining the cumulative number of said signals which have been received, and c) means for time-controlling the number of said signals before said communication is answered, in order to enable a user to preprogram the number of said signals received before said communications device answers said incoming communication at a desired number of said signals for a given time of day, or for a specified automatically expiring length of time determining using said device, whereby said communications device advantageously manages said incoming communication.

2. The communications device of claim 1, wherein said communications device has notifying means for informing said user that said incoming communication is occurring.

3. The communications device of claim 2, wherein said notifying means are audible to said user.

4. The communications device of claim 3, wherein said audible notifying means comprise a ringer.

5. The communications device of claim 2, wherein said notifying means are visible to said user.

6. The communications device of claim 1, wherein said timing means comprise one or more timers associated with a microcomputer.

7. The communications device of claim 6, wherein said microcomputer contains a programmable register for storing the desired number of said signals associated with said time of day, and said length of time.

8. The communications device of claim 6, wherein said timers can be set for said length of time.

9. The communications device of claim 1, wherein said timing means can be controlled by said user from a remote location.

10. The communications device of claim 1, wherein said user can preprogram the number of said signals received before said communications device answers said incoming communication at a desired number of said signals for a given time of day and day of week, or for a specified length of time.

11. A communications device, comprising:

a) means for detecting an incoming communication, and b) audible means for providing a user with the content of a spoken message from said communication, and c) means for time-controlling a volume level of said audible means, in order to enable said user to preprogram said volume level at a desired volume level for a given time of day, or for a specified length of time, whereby said communications device advantageously manages said incoming communication.

12. The communications device of claim 11, wherein said timing means comprise one or more timers associated with a microcomputer.

13. The communications device of claim 11, wherein said timing means can be controlled by said user from a remote location.

14. The communications device of claim 12, wherein said microcomputer contains a programmable register for storing the desired volume level associated with said time of day, and said length of time.

15. The communications device of claim 12, wherein said timers can be set for said length of time.

16. The communications device of claim 11, wherein said user can preprogram said volume level at a desired volume level for a given time of day and day of week, or for a specified length of time.

* * * * *